United States Patent
Takagi et al.

(10) Patent No.: US 11,597,127 B2
(45) Date of Patent: Mar. 7, 2023

(54) FOAM PARTICLE MOULDED ARTICLE, AND PRODUCTION METHOD THEREFOR

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 718 days.

(21) Appl. No.: 16/348,355

(22) PCT Filed: Nov. 8, 2017

(86) PCT No.: PCT/JP2017/040247
§ 371 (c)(1),
(2) Date: May 8, 2019

(87) PCT Pub. No.: WO2018/088428
PCT Pub. Date: May 17, 2018

(65) Prior Publication Data
US 2021/0060833 A1     Mar. 4, 2021

(30) Foreign Application Priority Data

Nov. 11, 2016 (JP) .............................. JP2016-221052

(51) Int. Cl.
C08J 9/18      (2006.01)
B29C 44/44    (2006.01)
C08J 9/232    (2006.01)

(52) U.S. Cl.
CPC .................. B29C 44/44 (2013.01); C08J 9/18 (2013.01); C08J 9/232 (2013.01)

(58) Field of Classification Search
CPC .............. B29C 44/44; C08J 9/228; C08J 9/16
See application file for complete search history.

(56) References Cited

U.S. PATENT DOCUMENTS

| | | | | |
|---|---|---|---|---|
| 2014/0221517 A1* | 8/2014 | Shima | ..................... | C08L 23/10 |
| | | | | 521/139 |
| 2015/0218422 A1* | 8/2015 | Kato | ....................... | C08J 9/122 |
| | | | | 521/97 |
| 2016/0244584 A1* | 8/2016 | Keppeler | ................. | C08J 9/228 |

FOREIGN PATENT DOCUMENTS

| | | | |
|---|---|---|---|
| JP | H11-106547 | A | 4/1999 |
| JP | 2000-095891 | A | 4/2000 |
| JP | 2008-533289 | A | 8/2008 |
| JP | 2010-163492 | A | 7/2010 |
| JP | 2011-184574 | A | 9/2011 |
| JP | 2012-082307 | A | 4/2012 |
| JP | 2013-028654 | A | 2/2013 |
| WO | WO2006099631 | * | 9/2006 |
| WO | 2016/181714 | A1 | 11/2016 |

OTHER PUBLICATIONS

JP2000095891A—Production of pre-expanded particle of polyolefin-based resin composition—Google Patents (Year: 2004).*
ASTM D2765 (Year: 2016).*
International Search Report for PCT/JP2017/040247, dated Jan. 23, 2018, and English Translation submitted herewith (5 pages).

* cited by examiner

*Primary Examiner* — Timothy Kennedy
*Assistant Examiner* — Alexander A Wang
(74) *Attorney, Agent, or Firm* — Fitch, Even, Tabin & Flannery LLP

(57) ABSTRACT

An expanded beads molded article containing a block copolymer of a polyethylene block and an ethylene-α-olefin copolymer block and having a density of 150 kg/m³ or more and 500 kg/m³ or less and a tensile strength of 0.5 MPa or more.

7 Claims, No Drawings

FOAM PARTICLE MOULDED ARTICLE, AND PRODUCTION METHOD THEREFOR

CROSS-REFERENCE TO RELATED APPLICATIONS

This application is a U.S. national phase application filed under 35 U.S.C. § 371 of International Application Number PCT/JP2017/040247, filed Nov. 8, 2017, designating the United States, which claims priority from Japanese Application Number 2016-221052, filed Nov. 11, 2016.

FIELD OF THE INVENTION

The present invention relates to an expanded beads molded article and a method for producing the same.

BACKGROUND OF THE INVENTION

Expanded polyolefin resin beads can be molded into various shapes depending on purposes thereof, and an expanded polyolefin resin beads molded article obtained through in-mold molding of the expanded beads is applied to a wide range of purposes including various kinds of a packaging and shock-absorbing material, a shock absorber for automobiles, a building material, and the like. As for an expanded beads molded article that is used as a seat cushioning material, a shock-absorbing material, and the like, a molded article having not only shock-absorbing property for impacts, but also more flexibility is demanded.

As a novel expanded article suitable for these purposes, replacing the polyolefin resin expanded beads, an expanded article of an ethylene-α-olefin copolymer is proposed (see, for example, PTL 1).

CITATION LIST

Patent Literatures

PTL 1: JP 2008-533289 A

SUMMARY OF INVENTION

However, PTL 1 describes about an expanded article of an ethylene-α-olefin copolymer of 150 kg/m$^3$ or more and 600 kg/m$^3$ or less, but does not sufficiently investigate about an expanded beads molded article, and there is a problem remaining from the standpoint of an expanded beads molded article excellent in durability. In particular, as for an expanded beads molded article in a density range of the molded article of 150 kg/m$^3$ or more and 500 kg/m$^3$ or less with a relatively low expansion ratio, it is difficult to provide expanded beads excellent in durability due to the decrease of the fusion bondability caused by the decrease of the secondary expandability of the expanded beads.

In view of the aforementioned objects, the present inventors have made earnest investigations with paying attention to an expanded beads molded article of a block copolymer of a polyethylene block and an ethylene-α-olefin copolymer block, and as a result, it has been found that the problem can be solved by the constitutions shown below, and thus the present invention has been completed.

Specifically, the present invention relates to the following.

[1] An expanded beads molded article, containing a block copolymer of a polyethylene block and an ethylene-α-olefin copolymer block and having a density of 150 kg/m$^3$ or more and 500 kg/m$^3$ or less and a tensile strength of 0.5 MPa or more.

[2] The expanded beads molded article according to the item [1], which has an average cell diameter (D1) of 100 μm or more and 300 μm or less.

[3] The expanded beads molded article according to the item [2], which has a ratio (D2/D1) of an average cell diameter (D2) of a fusion bonded portion of expanded beads of the expanded beads molded article to the average cell diameter (D1) of the expanded beads molded article of less than 1.0.

[4] The expanded beads molded article according to any one of the items [1] to [3], which has a xylene insoluble fraction of 30% by weight or more and 70% by weight or less by a hot xylene extraction method.

[5] The expanded beads molded article according to any one of the items [1] to [4], which has a content of a cell controlling agent of 0.05 part by weight or more and 5 parts by weight or less per 100 parts by weight of the block copolymer.

[6] The expanded beads molded article according to any one of the items [1] to [5], which has a tensile elongation of 100% or more.

[7] The expanded beads molded article according to any one of the items [1] to [6], wherein the block copolymer is a multi-block copolymer of a polyethylene block and an ethylene-1-octene copolymer block.

[8] A method for producing an expanded beads molded article containing a block copolymer of a polyethylene block and an ethylene-α-olefin copolymer block, having a molded article density of 150 kg/m$^3$ or more and 500 kg/m$^3$ or less and a tensile strength of 0.5 MPa or more, the method including: filling expanded beads of a block copolymer of a polyethylene block and an ethylene-α-olefin copolymer block having an attached amount of an anionic surfactant of 2 mg/m$^2$ or more, in a mold; and heating the expanded beads with steam, so as to fusion bond the expanded beads to each other.

The expanded beads molded article of the present invention is an expanded beads molded article containing a block copolymer of a polyethylene block and an ethylene-α-olefin copolymer block, the expanded beads molded article having a density of 150 kg/m$^3$ or more and 500 kg/m$^3$ or less, the expanded beads molded article having a tensile strength of 0.5 MPa or more, and thereby an expanded beads molded article having excellent fusion bondability and good durability can be provided as an expanded beads molded article having a relatively low expansion ratio.

DESCRIPTION OF EMBODIMENTS

The expanded beads molded article of the present invention is an expanded beads molded article of expanded beads of a block copolymer of a polyethylene block and an ethylene-α-olefin copolymer block, in which the expanded beads molded article has a density of 150 kg/m$^3$ or more and 500 kg/m$^3$ or less, and the expanded beads molded article has a tensile strength of 0.5 MPa or more.

The expanded beads constituting the expanded molded article of the present invention and the expanded beads molded article will be described in detail below.

The expanded beads molded article of the present invention is an expanded beads molded article of a block copolymer of a polyethylene block and an ethylene-α-olefin copolymer block (which may be hereinafter referred simply to as a block copolymer (I)).

Block Copolymer (I)

The block copolymer (I) has a polyethylene block and an ethylene-α-olefin copolymer block.

The polyethylene block corresponds to a hard block, and the ethylene-α-olefin copolymer block corresponds to a soft block. The polyethylene block and the ethylene-α-olefin copolymer block are preferably arranged in a linear form. A third block is preferably not contained.

In the polyethylene block, the proportion of the component of the constitutional unit derived from ethylene is preferably more than 95% by weight, and more preferably more than 98% by weight, based on the weight of the polyethylene block. In the ethylene-α-olefin copolymer block, the proportion of the component of the constitutional unit derived from the α-olefin is preferably more than 5% by weight, more preferably more than 10% by weight, and further preferably more than 15% by weight, based on the weight of the ethylene-α-olefin copolymer block.

The proportion of the polyethylene block can be calculated based on data obtained by differential scanning calorimetry (DSC) or nuclear magnetic resonance (NMR).

The ethylene-α-olefin copolymer block in the block copolymer (I) is preferably a block of a copolymer of a $C_3$ to $C_{20}$ α-olefin and ethylene. Examples of the α-olefin copolymerized with ethylene in the ethylene-α-olefin copolymer block include propylene, 1-butene, 1-pentene, 1-hexene, 1-heptene, 1-octene, 1-nonene, 1-decene, 3-methyl- 1-butene, and 4-methyl-1-pentene, which may be used in combination. From the standpoint of the industrial availability, the characteristics, the economic efficiency, and the like, examples of the α-olefin copolymerized with ethylene include propylene, 1-butene, 1-hexene, and 1-octene, and 1-octene is particularly preferred.

The block copolymer (I) may have any of a di-block structure, a tri-block structure, and a multi-block structure, and particularly preferably has a multi-block structure. Examples of the multi-block copolymer include the ethylene-α-olefin copolymer described in PTL 1. Examples of the commercially available products of the multi-block copolymer include "INFUSE", a trade name, produced by The Dow Chemical Company.

The block copolymer (I) can be produced by using a known polymerization method using a known olefin polymerization catalyst.

Characteristics of Block Copolymer (I)

The density of the block copolymer (I) is preferably 800 kg/m$^3$ or more, more preferably 850 kg/m$^3$ or more, and further preferably 860 kg/m$^3$ or more, and is preferably 1,000 kg/m$^3$ or less, more preferably 900 kg/m$^3$ or less, and further preferably 890 kg/m$^3$ or less.

The melting point of the block copolymer (I) is preferably 110° C. or more, and more preferably 115° C. or more, and is preferably 150° C. or less, and more preferably 140° C. or less. In the case where the melting point of the block copolymer (I) is in the range, the compression set at a high temperature can be made small. The melting point of the block copolymer (I) may be measured by the heat flux differential scanning calorimetry described in JIS K7121 (1987) in such a manner that the block copolymer is heated from 30° C. to 200° C. at a temperature rise rate of 10° C./min, then cooled to 30° C. at a cooling rate of 10° C./min, and then again heated from 30° C. to 200° C. at a temperature rise rate of 10° C./min to provide a DSC curve, and the melting point is obtained from the peak temperature of the endothermic peak determined by the DSC curve. In the case where plural endothermic peaks appear in the DSC curve for the second heating, the peak temperature of the endothermic peak having the largest area is designated as the melting point.

The flexural modulus of the block copolymer (I) is preferably 10 MPa or more, more preferably 12 MPa or more, and further preferably 15 MPa or more, and is preferably 100 MPa or less, more preferably 50 MPa or less, and further preferably 40 MPa or less. The flexural modulus of the block copolymer (I) is a value that is measured by the measurement method described in JIS K7171 (2008).

Additional Additive

The block copolymer (I) may contain an additional additive in such a range that does not impair the objects and effects of the present invention. Examples of the additional additive include an antioxidant, an ultraviolet ray inhibitor, an antistatic agent, a flame retardant, a flame retarding assistant, a metal deactivator, a conductive filler, and a cell controlling agent.

The additional additive is preferably 20 parts by weight or less, more preferably 10 parts by weight or less, and further preferably 5 parts by weight or less, per 100 parts by weight of the block copolymer (I). The additive is generally used in a requisite minimum amount. The additive may be contained in the polymer particles, for example, in such a manner that the additive is added to an extruder along with the block copolymer (I) and kneaded therewith in the production of the polymer particles.

The block copolymer (I) may contain an additional polymer different from the block copolymer (I) in such a range that does not impair the objects and effects of the present invention. Examples of the additional polymer different from the block copolymer (I) include a thermoplastic resin and a thermoplastic elastomer, such as a polyolefin resin (e.g., a polyethylene resin, a polypropylene resin, and a polybutene resin), and a polystyrene resin. The mixing ratio of the additional polymer is preferably 10 parts by weight or less, and more preferably 5 parts by weight or less, per 100 parts by weight of the block copolymer (I), and it is particularly preferred that only the block copolymer (I) is contained.

Density of Expanded Beads Molded Article: Molded Article Density

The density of the expanded beads molded article of the present invention (molded article density) is 150 kg/m$^3$ or more and 500 kg/m$^3$ or less. In the case where the density of the expanded beads molded article is less than 150 kg/m$^3$, the desired objects cannot be achieved, and in the case where the density exceeds 500 kg/m$^3$, there is a possibility that a good expanded beads molded article is difficult to provide. The density of the expanded beads molded article (kg/m$^3$) can be obtained by dividing the weight W (g) of the molded article by the volume V (L) thereof (W/V). The volume V of the expanded beads molded article may be measured by the submersion method.

Tensile Strength of Expanded Beads Molded Article

The tensile strength of the expanded beads molded article of the present invention is 0.5 MPa or more. In the case where the tensile strength of the expanded beads molded article is less than 0.5 MPa, the durability thereof is deteriorated. The expanded beads molded article of the present invention is excellent particularly in tensile strength, and therefore can be applied to such purposes that an impact is locally applied, or a strain resistance is required. For example, the expanded beads molded article that has a tensile strength of 0.5 MPa or more may be prevented from being broken to show excellent durability in such purposes as a seat cushioning material, a seat core material, a pad material for sporting, a shoe sole material, and a packing material. From this standpoint, the tensile strength of the expanded beads molded article more preferably 0.6 MPa or more. The upper limit of the tensile strength of the expanded beads molded article is may be approximately 1 MPa or less, and preferably 0.9 MPa or less. The tensile strength can be measured according to JIS K6767 (1999). A test piece for the measurement of the tensile strength may be a cut piece produced by cutting out from the expanded beads molded article in such a manner that all the surfaces thereof are cut surfaces (excluding the surface portion).

Average Cell Diameter (D1) of Expanded Beads Molded Article

The average cell diameter (D1) of the expanded beads molded article is preferably 100 µm or more and 300 µm or less. With the aforementioned range, the cells of the expanded beads may withstand the secondary expansion, so as to provide an expanded beads molded article excellent in fusion bondability. Furthermore, the resulting expanded beads molded article may have high mechanical strength and excellent durability. From this standpoint, the average cell diameter (D1) of the expanded beads molded article is more preferably 110 µm or more, and further preferably 120 µm or more, and is more preferably 280 µm or less, and further preferably 250 µm or less.

The average cell diameter (D1) may be measured in the following manner according to ASTM D3576-77. Specifically, a cut cross sectional surface obtained by cutting the center portion of the expanded beads molded article into substantially equal halves is imaged with a scanning electron microscope at a magnification of 30. On the resulting cross sectional micrograph, straight lines are drawn from the approximately center of one of the expanded beads in the molded article toward eight directions at regular intervals to the fusion bonded portion, and the number of cells intersecting the straight lines is counted all. A value obtained by dividing the total length of the straight lines by the number of the counted cells is designated as an average chord length. The cell diameter of the expanded beads molded article is calculated by dividing the chord length by 0.616. The aforementioned measurement is performed for 10 or more expanded beads forming the molded article, and the arithmetic average value thereof is designated as the average cell diameter (D1).

Average Cell Diameter (D2) of Fusion Bonded Portion of Expanded Beads Molded Article The average cell diameter (D2) of the fusion bonded portion of the expanded beads molded article is preferably 5 µm or more and 50 µm or less. The fusion bonded portion herein means a region that is adjacent to the fusion bonding interface between the expanded beads that is formed through fusion bonding of the expanded beads in a mold in the formation of the expanded beads molded article. In the case where the average cell diameter (D2) of the fusion bonded portion of the expanded beads molded article is in the range, the expanded beads molded article may be excellent in mechanical strength. From this standpoint, the average cell diameter of the fusion bonded portion of the expanded beads in the expanded beads molded article is preferably 10 µm or more and is preferably 30 µm or less.

The average cell diameter (D2) may be measured in the following manner according to ASTM D3576-77. A cut cross sectional surface obtained by cutting the center portion of the expanded beads molded article into substantially equal halves is imaged with a scanning electron microscope at a magnification of 30. On the resulting cross sectional micrograph, in one of the expanded beads constituting the molded article, 32 straight lines are drawn from the fusion bonded portion on the surface of the expanded bead omnidirectionally at regular intervals to the center of the expanded bead, and for each of the cells adjacent to the fusion bonded portion that are intersected by the 32 straight lines, the distance on the straight line from the fusion bonded portion to the next cell wall toward the center is measured. The arithmetic average of the measured values is designated as the cell diameter of the fusion bonded portion of the expanded bead of the expanded beads molded article. The aforementioned measurement is performed for 10 or more expanded beads, and the arithmetic average value thereof is designated as the average cell diameter (D2) of the fusion bonded portion of the expanded beads of the expanded beads molded article.

The ratio (D2/D1) of the average cell diameter (D2) of the fusion bonded portion of the expanded beads molded article to the average cell diameter (D1) of the expanded beads molded article is preferably less than 1.0, more preferably 0.05 or more and 0.5 or less, and further preferably 0.1 or more and 0.3 or less. With the aforementioned range, the cell diameter of the fusion bonded portion of the expanded beads molded article is relatively small, and a molded article having the expanded beads that are firmly fusion bonded to each other may be obtained.

Thickness (T2) of Cell Wall Formed Through Fusion Bonding of Expanded Beads in Expanded Beads Molded Article The thickness (T2) of the cell wall formed through fusion bonding of the expanded beads in the expanded beads molded article is preferably 20 µm or more and 100 µm or less. The expanded beads molded article is formed through fusion bonding of the expanded beads in a mold in the molding thereof. The expanded beads are fusion bonded by softening the surfaces thereof with a heating medium, and therefore, the thickness (T2) of the cell wall formed through fusion bonding of the expanded beads in the expanded beads molded article becomes larger than the thickness of the cell wall in the interior of the expanded beads. In the case where the molded article is formed to make a thickness (T2) of the cell wall formed through fusion bonding of the expanded beads of 20 µm or more and 100 µm or less, the expanded beads molded article may be excellent in tensile strength.

Since the fusion bondability of the expanded beads is enhanced with a smaller wall thickness of the surface layer of the expanded beads, the thickness of the cell wall formed through fusion bonding of the expanded beads in the expanded beads molded article is preferably smaller within the aforementioned range of the thickness, and the thickness (T2) of the cell wall formed through fusion bonding of the expanded beads in the expanded beads molded article is more preferably 23 μm or more, and further preferably 25 μm or more, and is more preferably 70 μm or less, and further preferably 50 μm or less.

For providing the expanded beads molded article having the expanded beads that are firmly fusion bonded to each other, the expanded beads excellent in fusion bondability may be subjected to in-mold molding, and the expanded beads molded article firmly fusion bonded can also be obtained by a method including: filling the expanded beads having an attached amount of an anionic surfactant of 2 mg or more in a mold; and heating the expanded beads with steam, so as to fusion bond the expanded beads to each other. In this case, since the dispersant attached to the surface of the expanded beads may be removed even in the case where the wall thickness of the surface layer of the expanded beads is relatively large, the expanded beads molded article excellent in tensile strength can be obtained, and the expanded beads molded article excellent in fusion bondability can be obtained even in the case where the thickness (T2) of the cell wall formed through fusion bonding of the expanded beads at this time is 40 μm or more.

Accordingly, in the relatively large molded article density range as in the present invention, even in the case where the secondary expandability of the expanded beads is lowered, the expanded beads molded article excellent in durability can be obtained through in-mold molding of the expanded beads enhanced in fusion bondability, for example, by decreasing the surface layer wall thickness of the expanded beads, or subjecting the expanded beads to a coating treatment, as described above.

The thickness (T2) of the cell wall formed through fusion bonding of the expanded beads in the present invention may be measured in the following manner.

A cut cross sectional surface obtained by cutting the expanded beads molded article into substantially equal halves is imaged with a scanning electron microscope at a magnification of 300. In at least 10 position on the resulting cross sectional micrograph, the thickness of the cell wall positioned between the expanded beads connected to each other at the position where the interfaces of the expanded beads are fusion bonded to each other is measured. The arithmetic average value of the measured values is designated as the thickness of the cell wall formed through fusion bonding of the expanded beads. The thickness of the cell wall formed through fusion bonding of the expanded beads shows the minimum distance on the cell wall between the cells on the surface layer portion of the expanded beads adjacent to each other.

Average Cell Wall Thickness (T1) of Expanded Beads Molded Article

The average cell wall thickness (T1) of the expanded beads molded article is preferably 2 μm or more and 20 μm or less. With the aforementioned range, the cell wall forming the cells of the expanded beads molded article withstands the secondary expansion in the fusion bonding of the expanded beads and easily undergoes the fusion bonding. From this standpoint, the average cell wall thickness (T1) of the expanded beads molded article is more preferably 5 μm or more, and more preferably 15 μm or less.

The average cell wall thickness of the expanded beads molded article may be measured in the following manner.

A cut cross sectional surface obtained by cutting the center portion of the expanded beads molded article into substantially equal halves is imaged with a scanning electron microscope at a magnification of 300. On the resulting cross sectional micrograph, the thickness of the cell wall excluding the fusion bonded portion is measured in at least 10 positions. The arithmetic average value of the measured values is designated as the average cell wall thickness of the expanded beads molded article. The thickness of the cell wall shows the minimum distance on the cell wall.

Ratio (T2/T1) of Thickness (T2) of Cell Wall formed through Fusion Bonding of Expanded Beads to Average Cell Wall Thickness (T1) of Expanded Beads Molded Article The ratio (T2/T1) of the thickness (T2) of the cell wall formed through fusion bonding of the expanded beads to the average cell wall thickness (T1) of the expanded beads molded article of the present invention is preferably 2 or more and 6 or less. In the case where the ratio (T2/T1) is 2 or more and 6 or less, the expanded beads molded article excellent in fusion bondability and having good durability can be obtained.

Content of Cell Controlling Agent of Expanded Beads Molded Article

The content of the cell controlling agent in the expanded beads molded article of the present invention is preferably 0.05 part by weight or more and 5 parts by weight or less, more preferably 0.05 part by weight or more and 1 part by weight or less, and further preferably 0.05 part by weight or more and 0.5 part by weight or less, per 100 parts by weight of the block copolymer (I).

In the present invention, the cell controlling agent may be inorganic or organic particles contained in the block copolymer (I) in expansion, and examples thereof include an inorganic material, such as talc, mica, zinc borate, calcium carbonate, silica, titanium oxide, gypsum, zeolite, borax, aluminum hydroxide, and carbon, and an organic nucleating agent, such as a phosphoric acid nucleating agent, a phenol nucleating agent, an amine nucleating agent, and polyethylene fluoride resin powder of polytetrafluoroethylene (PTFE) and the like. The cell controlling agent used is preferably zinc borate or polytetrafluoroethylene (PTFE), and the cell controlling agent is more preferably zinc borate.

In the case where the cell controlling agent is contained in the block copolymer (I) constituting the expanded beads molded article in an amount in the aforementioned range, the expanded beads having a foam cell enhanced in fusion bondability can be readily obtained, and the resulting expanded beads molded article can be excellent in durability with a tensile strength of 0.5 MPa or more. From this standpoint, the content of the cell controlling agent is more preferably 0.8 part by weight or more and 3 parts by weight or less, and further preferably 1 part by weight or more and 3 parts by weight or less.

The average particle diameter of the cell controlling agent is preferably 0.01 μm or more, and more preferably 0.1 μm or more, and is preferably 50 μm or less, and more preferably 30 μm or less. The average particle diameter means a median diameter (d50) measured by the laser diffractive scattering particle size distribution measurement.

In the production of the expanded beads described later, the cell controlling agent is preferably added along with the other additives to the multi-block copolymer melted in an extruder in the granulation of the polymer particles. For uniformly dispersing the cell controlling agent, a master batch method is preferably employed, in which a master batch having the cell controlling agent added thereto in a high concentration is prepared, and the master batch is melted and kneaded along with the block copolymer (I) in the extruder.

Contraction Rate of Expanded Beads Molded Article

The contraction rate of the expanded beads molded article is preferably 5% or less, and more preferably 3% or more and 5% or less. The expanded beads molded article that has a contraction rate of 5% or less can be a preferred embodiment from the standpoint of the easiness in production of the expanded beads molded article. The contraction rate of the expanded beads molded article may be obtained in such a manner that the expanded beads molded article is dried in an oven at 60° C. for 12 hours and then gradually cooled to room temperature to provide an aged expanded beads molded article, the dimension in the width direction of which is measured, and the contraction rate of the expanded beads molded article is obtained from the ratio of the dimension in the width direction of the expanded beads molded article to the dimension in the width direction of the mold.

Modulus of Repulsion Elasticity of Expanded Beads Molded Article

The modulus of repulsion elasticity of the expanded beads molded article is preferably 50% or more and 57% or less. With the aforementioned range, the expanded beads molded article is excellent in durability with a small expansion ratio and simultaneously has suitable repulsion, and thus can be excellent in balance. The modulus of repulsion elasticity of the expanded beads molded article may be measured based on JIS K6255 (2013).

Modulus of Repulsion Elasticity of Block Copolymer (I)

The modulus of repulsion elasticity of the block copolymer (I) constituting the expanded beads molded article is preferably 40% or more and 60% or less. In the case where the modulus of repulsion elasticity of the block copolymer (I) is in the range, the cell wall in the foam cell of the expanded beads molded article formed through fusion bonding of the expanded beads can exhibit a sufficient repulsion elasticity.

In the case where the expanded beads of the block copolymer (I) are crosslinked expanded beads, the modulus of repulsion elasticity of the block copolymer (I) constituting the expanded beads molded article is a measured value of the expanded beads or a specimen of the block copolymer (I) constituting the expanded beads molded article, i.e., the block copolymer (I) having been subjected to the crosslinking step described later. The modulus of repulsion elasticity of the block copolymer (I) constituting the expanded beads molded article is preferably 45% or more and is preferably 60% or less.

Tensile Elongation of Expanded Beads Molded Article

The tensile elongation of the expanded beads molded article of the present invention is preferably 100% or more. With the aforementioned range, the expanded beads molded article may have good fusion bondability among the expanded beads, and can be applied to such purposes as a seat cushioning material, a pad material for sporting, and a shoe sole material. From this standpoint, the tensile elongation is more preferably 110% or more, further preferably 130% or more, and still further preferably 150% or more. The upper limit of the tensile elongation of the expanded beads molded article may be approximately 500%, preferably 400%, and more preferably 300%. The tensile elongation may be measured according to JIS K6767 (1999). A test piece therefor is a cut piece produced by cutting out from the expanded beads molded article in such a manner that all the surfaces thereof are cut surfaces, excluding the surface portion.

Xylene Insoluble Fraction of Expanded Beads Molded Article

In the expanded beads molded article of the present invention, the xylene insoluble fraction (i.e., the xylene insoluble fraction by a hot xylene extraction method) of the expanded beads molded article is preferably 10% by weight or more and 70% by weight or less, and more preferably 30% by weight or more and 70% by weight or less, based on the total amount of the expanded beads molded article. In the case where the xylene insoluble fraction is in the range, the cell wall may be excellent in strength to provide the target tensile strength, and the fusion bondability among the expanded beads may be excellent to provide excellent durability. From this standpoint, the xylene insoluble fraction of the expanded beads is further preferably 35% by weight or more, and particularly preferably 40% by weight or more, and is further preferably 60% by weight or less, and particularly preferably 55% by weight or less. In the present invention, the xylene insoluble fraction is one of the indices showing the crosslinked state of the block copolymer (I) constituting the expanded beads molded article, and may be measured in the following manner.

The xylene insoluble fraction of the expanded beads molded article can be controlled by the amount of the crosslinking agent added described later, and can also be controlled by the agitation condition, the heating condition, and the like in crosslinking the polymer particles in a closed vessel.

The xylene insoluble fraction can be obtained in such a manner that approximately 1.0 g of a test piece cut out from a part of the expanded beads molded article is weighed, the weight thereof is designated as the specimen weight W1, the weighed test piece is placed in a 150 mL round-bottom flask, 100 mL of xylene is added thereto and heated with a mantle heater under refluxing for 6 hours, the insoluble residue is separated by filtration with a metallic mesh of 100 mesh and dried in a vacuum dryer at 80° C. for 8 hours or more, the weight W2 of the resulting dried matter is measured, the percentage of the weight W2 with respect to the specimen weight W1 is obtained by ((W2/W1)×100) (%), and the average value of the five measured value (N=5) is designated as the xylene insoluble fraction.

Closed Cell Ratio of Expanded Beads Molded Article

The closed cell ratio of the expanded beads molded article is preferably 60% or more. In the case where the closed cell ratio is in the range, the repulsion against an external force can be further readily exhibited due to the cells formed independently from each other, and the compression properties can be enhanced. From this standpoint, the closed cell ratio of the expanded beads molded article is more preferably 70% or more, and further preferably 75% or more.

The closed cell ratio of the expanded beads molded article may be measured according to Procedure C described in ASTM D2856-70 with Air Pycnometer 930, produced by Toshiba Beckman Co., Ltd.

Compression Set of Expanded Beads Molded Article

The expanded beads molded article of the present invention preferably has a compression set, which is measured after compressing the molded article to a strain of 25% at 50° C. for 22 hours, releasing to the atmospheric pressure at 50° C., and then allowing to stand for 22 hours, of 15% or less, more preferably 12% or less, and further preferably 10% or less. With the aforementioned range, the expanded beads molded article may be excellent in restorability after compressing the molded article, and thus may be suitable for such purposes as a seat cushioning material, a pad material for sporting, a shoe sole material, and a packing material. In particular, the expanded beads molded article of the present invention may have excellent restorability even under a high temperature compression condition. From the standpoint of the restorability at a high temperature, it is preferred that the expanded beads molded article is constituted by the block copolymer (I), and the block copolymer (I) has a melting point of 110° C. or more and 150° C. or less. The compression set may be measured according to JIS K6767 (1999).

Compression Stress and Energy Absorbance at 50% Strain of Expanded Beads Molded Article The compression stress at 50% strain of the expanded beads molded article is preferably 250 kPa or more. The expanded beads molded article of the present invention has a high tensile strength even though the expanded beads molded article has a relatively low expansion ratio and a high rigidity with a large compression stress at 50% strain.

The energy absorbance at 50% strain of the expanded beads molded article is preferably 65 J/L or more. With the aforementioned range, the favorable expanded beads molded article achieving both the repulsion and the energy absorption can be obtained. From this standpoint, the energy absorbance is more preferably 70 J/L or more.

The energy absorbance can be obtained according to JIS K7220 (1999) in such a manner that a test piece is subjected to a compression test under conditions of a temperature of 23° C. and a compression speed of 10 mm/min to provide a stress-strain curve, and the energy absorbance per unit volume is obtained according to the following expression (2) and converted to the unit J/L (joule/litter) to provide the energy absorbance of the molded article.

Energy absorbance per unit volume (kgf/cm/cm$^3$)=
stress at 50% strain (kgf/cm$^2$)×energy absorption efficiency to 50% strain×0.5 (cm/cm)  (2)

Method for Producing Expanded Beads

Examples of the method for producing the expanded beads include a method, in which the block copolymer (I) and a blowing agent are supplied to an extruder and melted therein, and the block copolymer (I) is extruded and expanded from a die attached to the end of the extruder to provide an expanded material of the block copolymer (I), which is cooled and then pelletized to cut into particles, a method, in which particles of the block copolymer (I) are produced and then impregnated with a blowing agent in a closed vessel to provide expandable particles, and the expandable particles are released from the closed vessel to provide expanded beads, and a method, in which the expandable particles of the block copolymer (I) are taken out from the closed vessel, dehydrated by drying, and then expanded by heating with a heating medium to provide expanded beads.

In the case where the block copolymer (I) is crosslinked, examples of the method for producing the expanded beads include a method, in which the block copolymer (I), a crosslinking agent, and a blowing agent are supplied to an extruder and melted therein to crosslink the block copolymer (I), and the crosslinked block copolymer (I) is extruded and expanded from a die attached to the end of the extruder to provide a crosslinked expanded material of the block copolymer (I), which is cooled and then pelletized to cut into particles, and a method, in which expandable crosslinked particles obtained by the processes (A) and (B) described later are expanded by releasing from the closed vessel to provide expanded beads. The method of crosslinking the polymer particles by using an organic peroxide has been described above, but the crosslinking treatment in the present invention is not limited to the use of an organic peroxide, and the crosslinked particles or the expanded beads may be obtained through a crosslinking treatment by a known method, such as an electron beam crosslinking method.

As a method for producing expanded beads used in the expanded beads molded article of the present invention, specifically, non-expanded particles may be produced by steps of kneading and granulating the block copolymer (I) as shown in the process (A) described later. Subsequently, the resulting non-expanded particles are subjected to the process (B) including steps of crosslinking, impregnating with a blowing agent, and expanding, so as to produce the expanded beads.

In the case where the expanded beads are produced by the aforementioned processes, the melt flow rate at 190° C. and a load of 2.16 kg of the block copolymer (I) may be selected from a range of preferably 2 g/10 min or more, more preferably 3 g/10 min or more, and further preferably 4 g/10 min or more, and a range of preferably 10 g/10 min or less, more preferably 8 g/10 min or less, and further preferably 7 g/10 min or less. In the case where the melt flow rate is in the range, the expanded beads of the block copolymer (I) may have good fusion bondability, and the expanded beads molded article may have excellent restorability. The melt flow rate is a value of the block copolymer (I) before the crosslinking step described later measured according to JIS K7210-1 (2014) under conditions of a temperature of 190° C. and a load of 2.16 kg.

Process (A): Steps of Kneading and Granulating Block Copolymer

Particles of the block copolymer (I) (which may be hereinafter referred to as "polymer particles") are produced by a known granulating method, such as a method in which the block copolymer is supplied to an extruder and kneaded to form a molten kneaded material, the molten kneaded material is extruded from the extruder into a strand form, and the strand is cut into a size suitable for forming the expanded beads. For example, the molten kneaded material having been extrusion-molded into a strand form in the aforementioned method is cooled with water, and then cut into a prescribed length, so as to provide the polymer particles having a target particle weight.

The average weight per one of the polymer particles is preferably 0.8 mg or more and 8 mg or less. The polymer particles may contain known additives, such as a flame retardant, a flame retarding assistant, a plasticizer, an antistatic agent, an antioxidant, an ultraviolet ray absorbent, a light stabilizer, a conductive filler, and an antibacterial agent. The cell controlling agent is also preferably contained in the stage of the polymer particles by the method using a master batch. The additives may be added in the step of kneading in the process (A) to obtain the polymer particles.

The expanded beads used in the present invention can be expanded beads having a target average cell diameter and a target average surface layer wall thickness by changing the expanding conditions, such as the kind and the amount of the cell controlling agent added, the expanding method, the expanding temperature, the amount of the blowing agent, and the expanding atmosphere, and the characteristics of the resin. For example, in the case where the amount of the cell controlling agent (foam nucleating agent) added is increased, the amount of foam nuclei may be increased to provide a tendency that the size of the cells is decreased, and the cell wall thickness is decreased.

Process (B): Steps of Crosslinking, Impregnating with Blowing Agent, and Expanding Polymer Particles In the process (B), the polymer particles are dispersed in a dispersing medium, such as water, along with the crosslinking agent in a closed vessel, such as an autoclave, and the crosslinked particles are impregnated with the blowing agent by heating under agitation to soften and crosslink the polymer particles, so as to provide expandable particles. Thereafter, the expandable particles are expanded to provide the expanded beads.

Dispersing Medium

The dispersing medium used in the production of the expanded beads used in the expanded beads molded article of the present invention is not particularly limited, as far as the dispersing medium does not dissolve the polymer particles. Examples of the dispersing medium include water, ethylene glycol, glycerin, methanol, and ethanol. The dispersing medium is preferably water.

In the process (B), a dispersant may be further added to the dispersing medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. Among these, kaolin is preferred as the dispersant. A surfactant may be further added to the dispersing medium. Examples of the surfactant include sodium oleate and a sodium alkylbenzenesulfonate, such as sodium dodecylbenzenesulfonate, and also include an anionic surfactant, a nonionic surfactant, and the like that are generally used in suspension polymerization. The surfactant is preferably a sodium alkylbenzenesulfonate.

Crosslinking Agent and Crosslinking

In the process (B), a crosslinking agent may be used for crosslinking the polymer particles. The crosslinking agent may be added to the dispersing medium in advance, and may be added to the dispersing medium after dispersing the polymer particles therein. The crosslinking agent is not particularly limited, as far as the crosslinking agent can crosslink the block copolymer (I). The crosslinking agent used may be a known organic peroxide used for crosslinking a polyethylene resin, and examples thereof include the Percumyl-based compound, such as dicumyl peroxide and tert-butylcumyl peroxide, the Perbutyl-based compound, such as 1,1-bis(tert-butylperoxy)-3,3,5-trimethylcyclohexane, 2,5-dimethyl-2,5-di(tert-butylperoxy)hexane, and di-tert-butyl peroxide, the Perhexyl-based compound, such as tert-hexyl peroxybenzoate, and the Perocta-based compound, such as 1,1,3,3-tetramethylbutyl peroxy-2-ethylhexanoate. Among these, the Percumyl-based compound and the Perbutyl-based compound are preferred, and dicumyl peroxide is more preferred. These compounds may be used alone or as a combination of two or more kinds thereof. The amount of the crosslinking agent mixed is preferably 0.1 part by weight or more, and more preferably 0.2 part by weight or more, and is preferably 8 parts by weight or less, and more preferably 5 parts by weight or less, per 100 parts by weight of the block copolymer (I) (polymer particles).

In the case where the amount of the crosslinking agent added is in the range, the multi-block copolymer constituting the polymer particles is crosslinked to provide crosslinked particles having appropriate crosslinking. The crosslinked particles can be sufficiently expanded, and in the expansion, the cell wall forming the cells can sufficiently withstand the expansion.

The crosslinking reaction is preferably performed at a temperature that is equal to or higher than the temperature, at which the multi-block copolymer constituting the polymer particles dispersed in the dispersing medium is softened, and the crosslinking agent is substantially decomposed, which is specifically the 1-hour half-life period temperature of the organic peroxide or more and the melting point of the block copolymer (I) or more. The temperature may be retained for 1 to 200 minutes to perform the crosslinking.

Expansion

A blowing agent for expanding the crosslinked particles obtained through the crosslinking of the polymer particles is added to the dispersing medium in the closed vessel. It is preferred that the crosslinked particles in a softened state are impregnated with the blowing agent. The temperature for the impregnation with the blowing agent is not particularly limited, as far as the temperature is equal to or higher than the temperature, at which the polymer particles or the crosslinked particles are in a softened state, and is preferably 100° C. or more, more preferably 130° C. or more, and further preferably 140° C. or more, and is preferably 180° C. or less, more preferably 170° C. or less, and further preferably 165° C. or less. The impregnation of the blowing agent may be performed before the crosslinking step, during the crosslinking step, or after the crosslinking step as far as it is performed before the expanding step.

Blowing Agent

The blowing agent used is not particularly limited, as far as the blowing agent can expand the crosslinked particles. Examples of the blowing agent include an inorganic physical blowing agent, such as air, nitrogen, carbon dioxide, argon, helium, oxygen, and neon, and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred since it does not deplete the ozone layer and is inexpensive, in which nitrogen, air, and carbon dioxide are more preferred, and carbon dioxide is particularly preferred. The blowing agents may be used alone or as a combination of two or more kinds thereof. The amount of the blowing agent mixed may be determined in consideration of the apparent density of the target expanded beads, the kind of the block copolymer (I), the kind of the blowing agent, and the like, and is generally preferably 2 parts by weight or more and 20 parts by weight or less for the organic physical blowing agent and preferably 0.5 part by weight or more and 20 parts by weight or less for the inorganic physical blowing agent, per 100 parts by weight of the block copolymer (I). The crosslinking, impregnating, and expanding steps described above are preferably performed as a series of steps in the same closed vessel.

Production of Expanded Beads

The expandable crosslinked particles having been impregnated with the blowing agent and heated are discharged to an atmosphere having a pressure that is lower than the pressure in the closed vessel, so as to provide the expanded beads. Specifically, while retaining the pressure in the closed vessel to a pressure equal to or higher than the vapor pressure of the blowing agent, one end of the closed vessel under the water surface is opened, so as to discharge the expandable crosslinked particles containing the blowing agent along with the dispersing medium from the interior of the closed vessel to an atmosphere having a pressure that is lower than the pressure in the closed vessel, generally to the atmospheric pressure, thereby expanding the expandable crosslinked particles (which may be hereinafter referred to as a direct expanding method). The expanded beads can be produced in this manner.

In the case where the expanded beads are produced by the direct expanding method, there is a tendency that the cell diameter in the surface layer of the expanded beads is decreased, and the cell wall thickness on the surface of the expanded beads is decreased, and thereby the fusion bondability among the expanded beads can be particularly enhanced. From this standpoint, the ratio (D2/D1) of the average cell diameter (D2) of the fusion bonded portion of the expanded beads molded article to the average cell diameter (D1) of the expanded beads molded article is more preferably 0.05 or more, and further preferably 0.1 or more, and is preferably 0.5 or less, and further preferably 0.3 or less.

An anionic surfactant may be attached to the surface of the expanded beads used in the expanded beads molded article of the present invention, and thereby the fusion bondability thereof in in-mold molding can be enhanced. Examples of the anionic surfactant include a carboxylic acid type, a sulfonic acid type, a sulfate ester type, a phosphate ester type, and a polymer type. In the anionic surfactant, an alkanesulfonate salt, a polyacrylate salt, or a salt of a polyacrylic acid-sulfonic acid copolymer is preferably attached to the surface of the expanded beads since the expanded beads that are excellent in the effect of enhancing the fusion bondability in in-mold molding can be obtained. The anionic surfactant may be used solely or as a mixture of two or more kinds thereof.

The attached amount of the anionic surfactant to the expanded beads per unit surface area is preferably 2 mg/m$^2$ or more, more preferably 5 mg/m$^2$ or more, and particularly preferably 20 mg/m$^2$ or more. The upper limit of the attached amount thereof per unit surface area may be approximately 100 mg/m$^2$ or less. The attached amount of the anionic surfactant to the expanded beads may be a value that is calculated based on a value measured with a TOC (total organic carbon) measuring device. In the present invention, the measurement of TOC may be performed using Total Organic Carbon Analyzer, produced by Shimadzu Corporation (trade name: TOC-VCSH). The total carbon (TC) in water is constituted by the total organic carbon (TOC) and the inorganic carbon (IC) as the carbon component, providing the relationship TC=TOC+IC, i.e., TOC=TC−IC. Accordingly, TOC can be obtained by the TC−IC method.

The surface area per one of the expanded beads can be calculated in the following manner.

500 or more of the expanded beads having been allowed to stand under conditions of 50% RH, 23° C., and 1 atm for two days are precisely weighed (weight of the group of expanded beads: W1). Subsequently, a measuring cylinder having ethanol at 23° C. placed therein is prepared, in which the group of expanded beads is submerged with a metallic mesh or the like, and the volume of the group of expanded beads is obtained from the elevation of the ethanol level. The volume of the group of expanded beads is divided by the number of the expanded beads constituting the group of expanded beads to provide the volume V1 per one of the expanded beads.

Subsequently, assuming that the expanded bead is a true sphere, the true sphere equivalent radius R1 (m) of the group of expanded beads is obtained from the formula of volume of sphere ($V1=4\pi R1^3/3$) and the volume V1, and the true sphere equivalent radius R1 (m) is substituted into the formula of surface area of sphere ($S1=4\pi R1^2$) to provide the value S1, which is designated as the surface area (m$^2$) per one of the expanded beads.

In the case where the expanded beads molded article of the block copolymer of a polyethylene block and an ethylene-α-olefin copolymer block, having a molded article density of 150 kg/m$^3$ or more and 500 kg/m$^3$ or less and a tensile strength of 0.5 MPa or more of the present invention is to be provided, in particular, such a production method is preferably employed that includes: filling the expanded beads having an attached amount of an anionic surfactant of 2 mg/m$^2$ or more, in a mold; and heating the expanded beads with a heating medium, such as steam, so as to fusion bond the expanded beads to each other. According to the method, the expanded beads molded article can have good durability even though the expanded beads molded article has a molded article density of 150 kg/m$^3$ or more and 500 kg/m$^3$ or less, which tends to have deteriorated fusion bondability.

Average Cell Diameter of Expanded Beads

The average cell diameter (a) of the expanded beads used in the present invention is preferably 50 μm or more, more preferably 60 μm or more, and further preferably 70 μm or more, and is preferably 200 μm or less, more preferably 180 μm or less, and further preferably 160 μm or less. In the case where the average cell diameter is in the range, the cells can be prevented from being broken to form continuous cells in molding, and the fusion bondability can be prevented from being deteriorated, resulting in the favorable expanded beads molded article.

The average cell diameter may be measured in the following manner according to ASTM D3576-77. A cross sectional surface obtained by cutting the center portion of the expanded bead into substantially equal halves is imaged with a scanning electron microscope. On the resulting cross sectional micrograph, straight lines are drawn from the approximately center of the cross sectional surface of the expanded bead toward eight directions at regular intervals to the surface layer, and the number of cells intersecting the straight lines is counted. A value obtained by dividing the total length of the straight lines by the number of the counted cells is designated as an average chord length of the cell. The cell diameter of the expanded bead is calculated by dividing the chord length by 0.616. The operation is performed for at least 10 expanded beads, and the arithmetic average value of the cell diameters of the expanded beads is designated as the average cell diameter.

Average Surface Layer Wall Thickness of Expanded Beads and Measurement Thereof

The average surface layer wall thickness of the expanded beads of the present invention is preferably 3 µm or more and is preferably 35 µm or less. In the case where the average surface layer wall thickness is in the range, the cells on the surface of the expanded beads can be prevented from being broken through softening of the surface layer portion of the expanded beads by heating in the molding and heating, so as to facilitate the fusion bonding of the expanded beads, resulting in the favorable expanded beads molded article. From this standpoint, the average surface layer wall thickness is preferably 5 µm or more, and more preferably 7 µm or more, and is preferably 30 µm or less, and more preferably 25 µm or less.

In the present invention, the average surface layer wall thickness of the expanded beads may be measured in the following manner.

A cross sectional surface obtained by cutting the expanded bead into substantially equal halves is imaged with a scanning electron microscope at a magnification of 300. In the surface layer portion of the expanded bead on the resulting cross sectional micrograph, cells that are positioned outermost the expanded bead and are connected in the circumferential direction are selected at least 10 positions, the minimum values of the cell wall thickness of the cells on the side of the surface of the expanded bead are measured, and the arithmetic average value of the measured values is designated as the surface layer thickness of the expanded bead. The operation is performed for 30 or more expanded beads, and the arithmetic average value of the surface layer thicknesses of the expanded beads is designated as the average surface layer wall thickness.

Apparent Density of Expanded Beads

The apparent density of the expanded beads used in the expanded molded article of the present invention is preferably 150 kg/m³ or more, and more preferably 160 kg/m³ or more, and is preferably 400 kg/m³ or less, and more preferably 300 kg/m³ or less. In the case where the apparent density of the expanded beads is in the range, the expanded beads molded article having the target molded article density can be readily obtained. In the case where an expanded beads molded article having a low expansion ratio is to be obtained as in the present invention, it is necessary to use expanded beads having a low expansion ratio, but the expanded beads of this type has a tendency that the secondary expandability and the fusion bondability in molding the expanded beads are deteriorated, and therefore it is difficult to provide an expanded beads molded article excellent in fusion bondability. In the present invention, an expanded beads molded article excellent in durability can be obtained through in-mold molding of the expanded beads having enhanced fusion bondability.

The apparent density can be obtained in such a manner that a measuring cylinder having ethanol placed therein is prepared, in which 500 or more expanded beads (weight of the group of expanded beads: Wt) are submerged with a metallic mesh or the like, and the volume of the group of expanded beads obtained from the elevation of the ethanol level is divided by the weight of the group of expanded beads.

Average Bead Diameter of Expanded Beads

The average bead diameter of the expanded beads used in the expanded beads molded article of the present invention is preferably 0.5 mm or more, and more preferably 1 mm or more, and is preferably 6 mm or less, and more preferably 5 mm or less. In the case where the average bead diameter of the expanded beads is in the range, the expanded beads can be readily produced, and the expanded beads can be readily filled in a mold in the in-mold molding of the expanded beads. The average bead diameter of the expanded beads can be controlled, for example, by controlling the amount of the blowing agent, the expanding condition, the particle diameter of the polymer particles, and the like. The average bead diameter of the expanded beads can be obtained in such a manner that arbitrary 100 expanded beads each are measured for the maximum diameter, and the average value of the calculated values is designated as the average diameter of the expanded beads.

Bead Weight of Expanded Beads

The bead weight of the expanded beads used in the expanded beads molded article of the present invention (which may be hereinafter referred simply to as "expanded beads") is preferably 0.8 mg or more and 8 mg or less, and more preferably 1 mg or more and 6 mg or less. With the aforementioned range, the expanded beads can be readily produced, and in the in-mold molding of the expanded beads, the expanded beads can be readily filled in a mold, resulting in the excellent expanded beads molded article.

The bead weight can be obtained in such a manner that 100 beads are randomly selected, the total weight (unit: mg) of the selected 100 beads is measured, and the measured weight is divided by 100 to provide a value, which is designated as the average bead weight (unit: mg).

Expanded Beads Molded Article

The expanded beads molded article can be obtained by subjecting the expanded beads of the block copolymer of a polyethylene block and an ethylene-α-olefin copolymer block to in-mold molding.

In-Mold Molding

The expanded beads molded article can be obtained by filling the expanded beads in a mold, and heating with a heating medium, such as steam, for molding, according to a known method. Specifically, the expanded beads molded article can be obtained in such manner that the expanded beads are filled in a mold, and then the expanded beads are heated and expanded by introducing a heating medium, such as steam, into the mold, thereby forming into the shape of the molding cavity through fusion bonding of the expanded beads to each other. The in-mold molding in the present invention is preferably performed by a pressure filling molding method (see, for example, JP 51-22951 B), in which the expanded beads are subjected in advance to a pressure treatment with a pressurized gas, such as air, to increase the pressure inside the expanded beads for controlling the pressure inside the expanded beads to 0.01 MPa (G) or more and 0.2 MPa (G) or less (G means the gauge pressure), then the expanded beads are filled in a cavity of a mold under the atmospheric pressure or reduced pressure, followed by closing the mold, and then a heating medium, such as steam, is introduced into the mold, whereby the expanded beads are subjected to fusion bonding with heat. The expanded beads may also be molded by a compression filling molding method (see JP 4-46217 B), in which in a cavity having been pressurized with a compression gas to a pressure higher than the atmospheric pressure, the expanded beads pressurized to that pressure or higher are filled, and then a heating medium, such as steam, is introduced into the cavity, whereby the expanded beads are subjected to fusion bonding with heat. In addition, the expanded beads may be molded by an ordinary pressure filling molding method (see JP 6-49795 B), in which the expanded beads having a high secondary expanding force obtained under a special condition are filled in a cavity of a pair of positive and negative molds under the atmospheric pressure or reduced pressure, and then a heating medium, such as steam, is introduced to fusion bond the expanded beads with heat, the method combining the aforementioned methods (see JP 6-22919 B), or the like.

In the specific in-mold molding of the expanded beads molded article of the present invention, the expanded beads molded article satisfying the fusion bondability can be obtained in the case where the expanded beads are filled in a mold to make a cracking of 5% by volume or more, and preferably 10% by volume or more, and of 200% by volume or less, and preferably 100% by volume or less. From the standpoint of the molding cycle, the cracking is preferably 10% by volume or more and preferably 50% by volume or less.

As for the meaning of cracking, in filling expanded beads to a cavity of a mold, an opening of the mold that prevents the mold from being completely closed, for efficiently filling the expanded beads exceeding the cavity volume, is referred to as a cracking, which is expressed by the ratio (%) of the volume of the opening with respect to the cavity volume of the mold. After filling the expanded beads in the mold, the cracking is finally closed in introducing steam, and as a result, the filled expanded beads are compressed.

EXAMPLES

The present invention will be described in more detail with reference to the following examples, but the present invention is not limited to the examples.

Evaluation

The expanded beads and the expanded beads molded articles used in Examples and Comparative Examples were subjected to the following evaluation. In the evaluation of the molded article, a specimen obtained by allowing the expanded beads molded article having been subjected to the aging and the like to stand under conditions of 23° C. and a humidity of 50% for 24 hours was measured.

Flexural Modulus of Block Copolymer (I)

The flexural modulus of the block copolymer (I) was measured according to the measurement method described in JIS K7171 (2016). In the measurement, a test piece of 80×10×4 mm was prepared and subjected to three-point flexure with a 10 kg load cell under conditions of a supporting point distance of 64 mm and a flexure rate of 2 mm/min. The flexural modulus was calculated from the gradient between the displacement of 0.5 mm or more and 1.0 mm or less.

Apparent Density of Expanded Beads

The apparent density was obtained in such a manner that a measuring cylinder having ethanol placed therein was prepared, in which 500 or more expanded beads (weight of the group of expanded beads: Wt) were submerged with a metallic mesh, and the volume of the group of expanded beads obtained from the elevation of the ethanol level was divided by the weight of the group of expanded beads.

Average Cell Diameter of Expanded Beads

The measurement was performed by the aforementioned measurement method for 30 expanded beads, and the arithmetic average value was obtained.

Average Surface Layer Wall Thickness of Expanded Beads

The measurement was performed by the aforementioned measurement method for 30 expanded beads, and the arithmetic average value was obtained.

Density of Expanded Beads Molded Article (Molded Article Density)

The measurement was performed by the aforementioned measurement method.

Contraction Rate of Expanded Beads Molded Article

The expanded beads molded article of 250 in length (l)×200 in width (w)×50 in depth (t) (mm) was dried in an oven at 60° C. for 12 hours and then gradually cooled to room temperature to provide an aged expanded beads molded article, the dimension in the width direction of which was measured, the contraction rate of the expanded beads molded article was obtained by the following expression (3), and the average value of the five measured value (N=5) was designated as the contraction rate.

Contraction rate of expanded beads molded article (%)=(200−width of aged expanded beads molded article (mm))/200×100    (3)

Modulus of Repulsion Elasticity of Expanded Beads Molded Article

The modulus of repulsion elasticity (R1) of the expanded beads molded article was measured according to JIS K6255 (2013) with a Schob type repulsion elasticity tester "RT-90" (produced by Kobunshi Keiki Co., Ltd.) under conditions of a relative humidity of 50% and 23° C. A specimen of 30 mm in length, 30 mm in width, and 12.5 mm in thickness (including the molding skin surface) was cut out from the center portion of the aged expanded beads molded article. The specimen was fixed with a double-sided adhesive tape with the skin surface of the specimen becoming a surface in contact with the end of the pendulum, and the pendulum having a hammer diameter of 15 mm and an arm weight of 0.25 kg was allowed to fall down from the position of a lift angle of 90±1°. The pendulum was allowed to be in contact with the skin surface of the specimen in the thickness direction thereof, and the rebound height h (mm) of the pendulum was measured. The rebound height h (mm) was divided by the fall height H (mm) of the pendulum, and the average value of the measured values of five points was designated as the modulus of repulsion elasticity.

Modulus of Repulsion Elasticity of Block Copolymer (I)

For the modulus of repulsion elasticity (R2) of the block copolymer (I) was obtained in the following manner, the expanded beads molded article was sufficiently defoamed by heat press at 230° C. several times, and a sheet having a thickness of 12.5 mm was produced. A specimen of 30 mm in length, 30 mm in width, and 12.5 mm in thickness (including the molding skin surface) was cut out from the center portion of the sheet. The specimen was measured according to JIS K6255 (2013) with a Schob type repulsion elasticity tester "RT-90" (produced by Kobunshi Keiki Co., Ltd.) under conditions of a relative humidity of 50% and 23° C. The average value of the measured values of five points was designated as the modulus of repulsion elasticity.

Xylene Insoluble Fraction of Expanded Beads Molded Article

A specimen of 1.0 g was cut out from the center portion of the expanded beads molded article, and measured according to the aforementioned measurement method. The average value of the measured values of five points was designated as the xylene insoluble fraction.

Closed Cell Ratio of Expanded Beads Molded Article

A measurement specimen of 25×25×30 mm excluding the skin layer was cut out from the center portion of the expanded beads molded article, and the specimen was allowed to stand in a thermostat chamber under conditions of the atmospheric pressure, a relative humidity of 50%, and 23° C. for 1 day, and then measured for the apparent volume Va of the specimen by the submersion method. The measurement specimen having been measured for the apparent volume Va was sufficiently dried, and then measured for the true volume Vx of the measurement specimen according to Procedure C described in ASTM D2856-70 with Air Pycnometer 930 (produced by Toshiba Beckman Co., Ltd.). The closed cell ratio was calculated based on the volumes Va and Vx according to the following expression (4), and the average value of the five measured values (N=5) was designated as the closed cell ratio of the expanded beads molded article.

$$\text{Closed cell ratio (\%)}=(Vx-W/\rho)\times 100/(Va-W/\rho) \qquad (4)$$

In the expression, $Vx$ represents the true volume of the expanded beads molded article measured by the aforementioned method, which is the sum of the volume of the block copolymer (I) constituting the expanded beads molded article and the total volume of the cells of the closed cell portion inside the expanded beads molded article ($cm^3$), $Va$ represents the apparent volume of the expanded beads molded article measured from the elevation of the water level when the expanded beads molded article is submerged in a measuring cylinder having water therein ($cm^3$), $W$ represents the weight of the measurement specimen of the expanded beads molded article (g), and $\rho$ represents the density of the block copolymer (I) constituting the expanded beads molded article ($g/cm^3$).

Average Cell Diameter (D1) of Expanded Beads Molded Article

The measurement was performed according to the aforementioned measurement method for 10 positions of the separate expanded beads on the cross sectional micrograph, and the arithmetic average value was obtained.

Average Cell Wall Thickness (T1) of Expanded Beads Molded Article

The thickness of the cell wall was measured according to the aforementioned measurement method for 10 positions excluding the fusion bonded portion, and the arithmetic average value was obtained.

Thickness (T2) of Cell Wall Formed Through Fusion Bonding of Expanded Beads in Expanded Beads Molded Article The thickness of the cell wall formed through the fusion bonding of the expanded beads in the expanded beads molded article was measured according to the aforementioned measurement method for 10 positions, and the arithmetic average value was obtained.

Average Cell Diameter (D2) of Fusion Bonded Portion of Expanded Beads of Expanded Beads Molded Article The measurement was performed according to the aforementioned measurement method for 10 expanded beads, and the arithmetic average value was obtained.

25% Compression Set of Expanded Beads Molded Article at 50° C.

5 test pieces each in the form of a cuboid having a length of 50 mm, a width of 50 mm, and a thickness of 25 mm were cut out from the expanded beads molded article while removing the skin layer formed in molding, allowed to stand in a state of compression by 25% in the thickness direction under an environment of a relative humidity of 50% at each of temperatures of 23° C. and 50° C. for 22 hours according to JIS K6767 (1999), and measured for the thickness after 30 minutes and 24 hours from the release of compression, from which the compression set (%) was obtained for each of the test pieces, and the arithmetic average value was designated as the compression set (%).

50% Compression Stress

A test piece of 50 mm in the form of a cuboid of length×50 mm in width×25 mm in thickness was cut out from the center portion of the expanded beads molded article while removing the skin layer formed in molding, and the test piece was measured for the load at 50% strain according to JIS K6767 (1999) at a compression speed of 10 mm/min with "Autograph AGS-X" (produced by Shimadzu Corporation), which was divided by the pressure receiving area of the test piece to provide the 50% compression stress (unit: kPa).

Energy Absorbance

A test piece of 50 mm in the form of a cuboid of length×50 mm in width×25 mm in thickness was cut out from the center portion of the expanded beads molded article while removing the skin layer formed in molding, and the test piece was measured for the static compression stress at a specimen temperature of 23° C. at 50% strain (compression speed: 10 mm/min) according to JIS K7220 (1999), so as to provide a stress-strain curve, based on which the energy absorbance of the molded article was calculated.

Tensile Strength and Tensile Elongation of Expanded Beads Molded Article

A cut-out piece was produced according to JIS K6767 (1999) to have cut surfaces on all the surfaces thereof (excluding the skin portion) obtained from the expanded beads molded article with a vertical slicer, and cut with a jig saw into the No. 1 dumbbell form (having a measurement portion having a length of 40 mm, a width of 10 mm, and a thickness of 10 mm), which was designated as a test piece. The test piece was subjected to a tensile test at a test speed of 500 mm/min, and measured for the maximum load and the distance between the gauge lines at breakage, in which the maximum tensile stress under tension was designated as the tensile strength, and the elongation at breakage was designated as the tensile elongation.

Example 1

Production of Particles of Block Copolymer (I)

To 100 parts by weight of a multi-block copolymer having a polyethylene block and an ethylene-α-olefin copolymer block having a density of 887 kg/m³, a melting point of 120° C., a melt flow rate of 5.4 g/10 min (190° C., load: 2.16 kg), a type A durometer hardness of 86, and a flexural modulus of 28 MPa ("INFUSE 9530", produced by The Dow Chemical Company), polytetrafluoroethylene (PTFE powder, "TFW-1000", a trade name, produced by Seishin Enterprise Co., Ltd., average particle diameter: 10 μm) as a cell controlling agent was added in the form of a 30% master batch in an amount of 0.3 part by weight per 100 parts by weight of the multi-block copolymer, and the mixture was placed in an extruder, melt-kneaded, extruded from a die with a diameter of 2 mm into the form of strand, cooled in water, and then granulated by cutting with a pelletizer to a particle weight of approximately 5 mg, so as to provide polymer particles of the multi-block copolymer.

Production of Expanded Beads 1 kg of the resulting polymer particles, 3 L of water as a dispersing medium, 3 g of kaolin and 0.04 g of a sodium alkylbenzenesulfonate as dispersants, and 0.8 part by weight of dicumyl peroxide as a crosslinking agent and 3 parts by weight of carbon dioxide (dry ice) as a blowing agent, per 100 parts by weight of the polymer particles, were charged in a closed vessel having a capacity of 5 L, and heated to 160° C. as the crosslinking and expanding temperature under agitation, which was retained for 30 minutes. Thereafter, while controlling the pressure in the vessel to a constant value of 2.2 MPa (G) by applying a back pressure with carbon dioxide, the particles impregnated with the blowing agent were discharged to the atmospheric pressure along with the dispersing medium at the temperature of the dispersing medium (expanding temperature) shown in Table 1, so as to provide expanded beads.

Production of Expanded Beads Molded Article

The resulting expanded beads were placed in a closed vessel, pressurized with compressed air of 0.2 MPa (G) for 12 hours to impart an internal pressure of 0.10 MPa (G) to the expanded beads, and after taking out from the vessel, subjected to in-mold molding in such a manner that the expanded beads were filled in a flat plate mold having a length of 250 mm, a width of 200 mm, and a thickness of 20 mm while the mold was not completely closed with an opening of the mold of 4 mm, followed by closing the mold to make a cracking of 20%, and were heated with steam and then cooled, and a molded article was taken out from the mold, and the resulting expanded beads molded article was aged in an oven adjusted to 60° C. for 12 hours, and taken out therefrom, thereby providing an expanded beads molded article of Example 1.

Example 2

Expanded beads were obtained in the same manner as in Example 1 except that zinc borate (which may be abbreviated as "ZnB", "Zinc Borate 2335", produced by Tomita Pharmaceutical Co., Ltd., average particle diameter: 6 μm) as a cell controlling agent was added in an amount of 0.1 part by weight per 100 parts by weight of the multi-block copolymer, and the conditions were changed to those shown in Table 1, and then the expanded beads and 50 mL of an aqueous solution of 5.4 kg/m³ of sodium polyacrylate were mixed in a blender, and dried in an oven at 40° C. for 12 hours, so as to provide expanded beads having an anionic surfactant attached to the surface thereof. An expanded beads molded article of Example 2 was obtained in the same manner as in Example 1 except that the conditions were changed to those shown in Table 1.

Example 3

An expanded beads molded article of Example 3 was obtained in the same manner as in Example 2 except that the conditions were changed to those shown in Table 1.

Example 4

An expanded beads molded article of Example 4 was obtained in the same manner as in Example 2 except that the conditions were changed to those shown in Table 1.

Comparative Example 1

An expanded beads molded article of Comparative Example 1 was obtained in the same manner as in Example 1 except that the conditions were changed to those shown in Table 1.

Comparative Example 2

An expanded beads molded article of Comparative Example 2 was obtained in the same manner as in Example 1 except that the conditions were changed to those shown in Table 1.

Comparative Example 3

An expanded beads molded article of Comparative Example 3 was obtained in the same manner as in Example 1 except that the conditions were changed to those shown in Table 1.

Evaluation Results

The evaluation results are shown in Table 1 below.

The expanded beads molded article of the present invention is an expanded beads molded article of an expanded beads containing a block copolymer of a polyethylene block and an ethylene-α-olefin copolymer block, the expanded beads molded article having a density of 150 kg/m$^3$ or more and 500 kg/m$^3$ or less, the expanded beads molded article having a tensile strength of 0.5 MPa or more. The expanded beads molded article of the present invention can provide an expanded beads molded article having excellent fusion bondability and good durability, and can be favorably utilized as a seat cushioning material, a pad material for sporting, a shoe sole material, a floor material, a packing material, and the like.

The invention claimed is:

1. An expanded beads molded article, comprising a block copolymer of a polyethylene block and an ethylene-α-olefin

TABLE 1

|  |  |  | Example | | | | Comparative Example | | |
| --- | --- | --- | --- | --- | --- | --- | --- | --- | --- |
|  |  |  | 1 | 2 | 3 | 4 | 1 | 2 | 3 |
| Polymer particles | Resin | Kind | TPO | TPO | TPO | TPO | TPO | TPO | TPO |
|  |  | Grade | INFUSE 9530 | INFUSE 9530 | INFUSE 9530 | INFUSE 9530 | INFUSE 9530 | INFUSE 9530 | INFUSE 9530 |
|  | Cell controlling agent | Kind | PTFE | ZnB | ZnB | PTFE | ZnB | ZnB | ZnB |
|  | Added amount | ppm | 3000 | 1000 | 1000 | 3000 | 1000 | 1000 | 1000 |
| Expanding condition | Amount of blowing agent | part by weight | 3 | 1 | 2 | 3 | 1 | 1 | 8 |
|  | Impregnation temperature | ° C. | 110 | 110 | 110 | 110 | 110 | 110 | 110 |
|  | Impregnation time | min | 30 | 30 | 30 | 30 | 30 | 30 | 30 |
|  | Crosslinking temperature | ° C. | 160 | 160 | 160 | 160 | 160 | 160 | 160 |
|  | Retention time | min | 30 | 30 | 30 | 30 | 30 | 30 | 30 |
|  | Expanding temperature | ° C. | 160 | 160 | 160 | 160 | 160 | 160 | 160 |
|  | Pressure of steam | MPa (G) | 2.2 | 1.0 | 1.7 | 2.2 | 1.2 | 1.0 | 4 |
| Expanded beads | Apparent density | kg/m$^3$ | 215 | 273 | 176 | 215 | 204 | 273 | 83 |
|  | Bulk density | kg/m$^3$ | 134 | 171 | 110 | 134 | 128 | 171 | 52 |
|  | Average cell diameter | μm | 138 | 172 | 141 | 138 | 150 | 172 | 111 |
|  | Average surface layer wall diameter | μm | 21 | 31 | 15 | 21 | 28 | 31 | 8 |
| Molding condition | Internal pressure | MPa (G) | 0.1 | 0.1 | 0.0 | 0.1 | 0.1 | 0.1 | 0.1 |
|  | Coating | Kind | — | sodium polyacrylate | sodium polyacrylate | sodium polyacrylate | — | — | — |
|  |  | % by weight | — | 0.27 | 0.27 | 0.27 | — | — | — |
|  | Cracking | % | 20 | 50 | 75 | 20 | 20 | 20 | 20 |
|  | Molding cycle | s | 160 | 200 | 250 | 160 | 150 | 180 | 60 |
|  | Molding pressure | MPa (G) | 0.20 | 0.22 | 0.20 | 0.2 | 0.2 | 0.2 | 0.16 |
| Expanded beads molded article | Molded article density | kg/m$^3$ | 166 | 265 | 222 | 166 | 158 | 218 | 53 |
|  | Contraction rate | % | 3.5 | 3.5 | 4.0 | 3.5 | 5.0 | 4.0 | 8.0 |
|  | Modulus of repulsion elasticity of molded article | % | 57 | 55 | 56 | 57 | 59 | 58 | 66 |
|  | Modulus of repulsion elasticity of copolymer | % | 51 | 51 | 51 | 51 | 51 | 51 | 51 |
|  | Xylene insoluble fraction | % by weight | 50 | 46 | 45 | 50 | 54 | 50 | 54 |
|  | Closed cell ratio | % | 82 | 86 | 75 | 83 | 82 | 85 | 70 |
|  | Thickness of interface of expanded beads (T2) | μm | 38 | 65 | 32 | 41 | 58 | 61 | 15 |
|  | Average cell wall thickness (T1) | μm | 8.2 | 13.8 | 6.6 | 8.2 | 8.4 | 13.8 | 2.3 |
|  | T2/T1 |  | 4.6 | 4.7 | 4.8 | 5.0 | 6.9 | 4.4 | 6.6 |
|  | Average cell diameter of fusion bonded portion (D2) | μm | 24 | 29 | 20 | 24 | 29 | 34 | 23 |
|  | Average cell diameter (D1) | μm | 162 | 232 | 175 | 162 | 190 | 240 | 160 |
|  | D2/D1 |  | 0.15 | 0.13 | 0.11 | 0.15 | 0.15 | 0.14 | 0.14 |
|  | Tensile strength | MPa | 0.64 | 0.75 | 0.82 | 0.80 | 0.47 | 0.47 | 0.29 |
|  | Tensile elongation | % | 171 | 110 | 170 | 180 | 114 | 100 | 171 |
|  | 25% Compression set at 50° C. | % | 11 | 6 | 6 | 6 | 6 | 6 | 11 |
|  | Compression stress at 50% strain | kPa | 305 | 489 | 409 | 305 | 290 | 402 | 96 |
|  | Energy absorbance at 50% strain | J/L | 74 | 120 | 100 | 74 | 71 | 98 | 22 | copolymer block, having a density of 222 kg/m³ or more and 500 kg/m³ or less and a tensile strength of 0.5 MPa or more, and having an average cell diameter (D1) of 110 μm or more and 300 μm or less, wherein a thickness (T2) of the cell wall formed through fusion bonding of the expanded beads in the expanded beads molded article is 20 μm or more and 100 μm or less, and the ratio (T2/T1) of the thickness (T2) of the cell wall formed through fusion bonding of the expanded beads to the average cell wall thickness (T1) of the expanded beads molded article is 2 or more and 6 or less.

2. The expanded beads molded article according to claim 1, which has a ratio (D2/D1) of an average cell diameter (D2) of a fusion bonded portion of expanded beads of the expanded beads molded article to the average cell diameter (D1) of the expanded beads molded article of less than 1.0.

3. The expanded beads molded article according to claim 1, which has a xylene insoluble fraction of 30% by weight or more and 70% by weight or less by a hot xylene extraction method.

4. The expanded beads molded article according to claim 1, which has a content of a cell controlling agent of 0.05 part by weight or more and 5 parts by weight or less per 100 parts by weight of the block copolymer.

5. The expanded beads molded article according to claim 1, which has a tensile elongation of 100% or more.

6. The expanded beads molded article according to claim 1, wherein the block copolymer is a multi-block copolymer of a polyethylene block and an ethylene-1-octene copolymer block.

7. The expanded beads molded article according to claim 1, wherein the ratio (T2/T1) of the thickness (T2) of the cell wall formed through fusion bonding of the expanded beads to the average cell wall thickness (T1) of the expanded beads molded article is about 4.7 or more and 6 or less.

* * * * *